350-96.24 SR
XR 3,714,447
TX3072R

United States

Jallais

[11] 3,714,447

[45] Jan. 30, 1973

[54] APPARATUS FOR THE PHOTO-OPTICAL READING OF MARKS AND PERFORATIONS ON RECORD MEDIA

[75] Inventor: Francois Denis Jallais, Belfort, France

[73] Assignee: Societe Industrielle Bull-General Electric (Societe Anonyme), Paris, France

[22] Filed: June 25, 1970

[21] Appl. No.: 49,736

[30] Foreign Application Priority Data

June 25, 1969 France....................6921330

[52] U.S. Cl...............250/227, 250/219 D, 350/96 R

[51] Int. Cl...........................H01j 5/16

[58] Field of Search.........250/219 R, 219 Q, 219 CR, 219 D, 250/219 DC, 219 DD, 227, 239; 350/96, 319

[56] References Cited

UNITED STATES PATENTS

| | | | |
|---|---|---|---|
| 3,581,100 | 5/1971 | Milford | 250/227 |
| 3,533,657 | 10/1970 | Da Silva | 250/219 DC |
| 3,432,676 | 3/1969 | Lindberg | 250/227 |
| 3,320,439 | 5/1967 | McGregor | 250/219 CR |

*Primary Examiner*—Archie R. Borchelt
*Assistant Examiner*—D. C. Nelms
*Attorney*—Baldwin, Wight & Brown

[57] ABSTRACT

Apparatus for optically reading record bearing media in which the sensitive elements are protected against dust and vapors, wherein the light transmitting end of the light source which illuminates the media and the light receiving end of the light collector which receives light from the media are enclosed in an air-tight housing, and wherein light communication between the interior of the housing and the media is provided by a light conducting block in the wall of said housing.

13 Claims, 2 Drawing Figures

3714447
OR IN 250/227

"PRIOR ART"

INVENTOR
François - Denis Jallais

BY

ATTORNEY

APPARATUS FOR THE PHOTO-OPTICAL READING OF MARKS AND PERFORATIONS ON RECORD MEDIA

BACKGROUND OF THE INVENTION

The present invention relates to improvements in apparatus for the photo-optical reading of marks on and perforations in record media such as record cards, punched tapes, account cards, checks or similar documents used in data processing machines or the like.

In reading equipments of this type, photoelectric means are usually combined with optical apparatus and lighting means for responding to variations in the reflecting power or in the transparency of elements of the surface of, record media advanced in succession through a reading station especially lighted for this purpose.

The accurate operation of this prior art reading equipment is at times impeded by dust carried by the record media, which dust accumulates on the optical surfaces, on the active surfaces of the photoelectric elements, or in openings provided for the passage of the light. Problems analogous to those produced by dust can similarly occur as a result of the condensation of vapor in reading apparatuses employed in an atmosphere saturated with humidity.

Therefore, the object of the present invention is to remedy these disadvantages of prior art reading apparatus.

Another object of this invention is to provide improved apparatus which permits the realization of reading equipments which are virtually insensitive to the presence of dust or to the condensation of vapors.

SUMMARY OF THE INVENTION

In accordance with the instant invention, an image conductor block of short length is disposed for conducting light through a wall disposed between the passage channel of the record media and the optical surfaces, diaphragms, or sensitive surfaces of photoelectric elements. The block and wall provide an airtight space, thereby protecting the sensitive surfaces against the accumulation of dust or the condensation of vapors. The invention provides further, by means of very simple complementary arrangements, for a substantial improvement of the definition capability of the reading apparatus. Thus, for example, in a device provided with sufficiently precise optical apparatus to permit the accurate reading of marks or perforations having a width of the order of 1 to 2 millimeters, the addition of a diaphragm provided with a slit of appropriate width permits, with an image conductor, the accurate reading of printed bars having a width and separation of only 0.15 mm. The latter dimensions are employed in printing COC5 and CMC7 characters or similar symbols, by printing juxtaposed bars arranged in coded combinations.

In the reading apparatus of the invention, a lighting device is adapted for illuminating a reading station and a reading device provided with photoelectric means is optically adapted for collecting light reflected or diffused into the reading station by a record medium advanced through such apparatus. An image conductor block is fixed in a housing, adapted for forming with the block an airtight or dust proof assemblage. One face of the block is disposed proximate to the record medium, the block comprising rectilinear light conductive fibers perpendicular to such face, the length of such fibers providing for the other face of the block to be spaced from the lighting device and the reading device.

BRIEF DESCRIPTION OF THE DRAWING

The invention will be described with reference to the accompanying drawing, wherein.

DESCRIPTION OF THE PREFERRED EMBODIMENT

Figure 1:
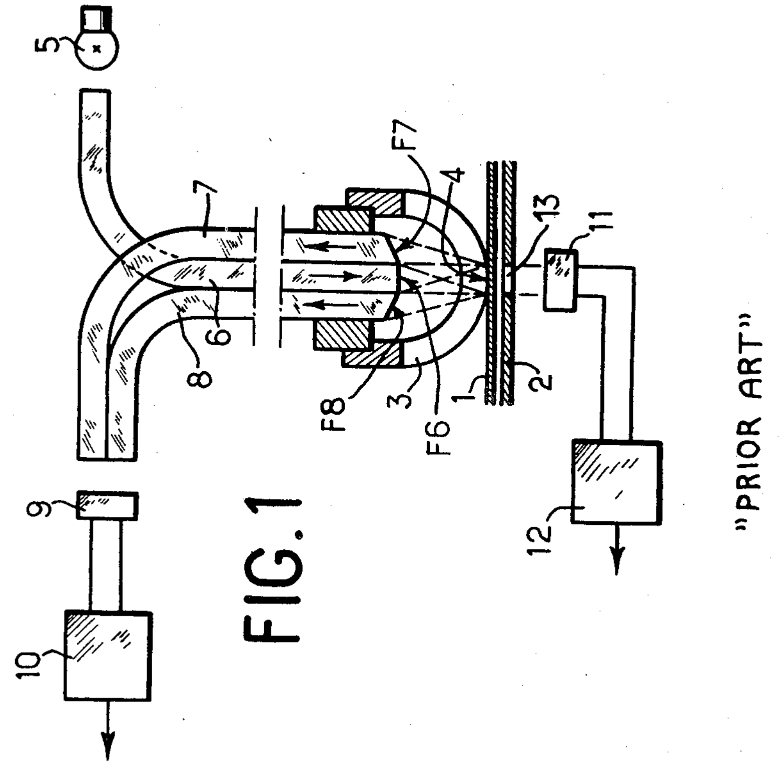
FIG. 1 is a schematic diagram of the principal elements of a reading apparatus, of known type, adapted for the photo-optical reading of marks and for the reading of perforations.

The prior art reading apparatus of FIG. 1 has been described in the in the copending U.S. application of Jean Paul Xavier Da Silva, Ser. No. 737,616, filed June 17, 1968, now U.S. Pat. No. 3,533,657, granted Oct. 13, 1970, corresponding to French patent N. 1,540,967, dated June 29, 1967. In the apparatus French patent No. 1,540,967, dated June 29, 1967. In the apparatus of FIG. 1, record bearing documents 1 are advanced in succession, by means not shown, along a guide channel comprising a guide plate 2 and a grating 3. Grating 3 is disposed for passing the documents into a reading station 4 where the documents are illuminated by a light source 5 through the intermediary of a light guide 6. Light guide 6 may be constituted of a light conductive translucent rod or be constituted, in known manner, of a very large number of light conductive fibers assembled to form what is convenient to call an image conductor, in which each light conductive fiber can transmit an element of the image from one end of the conductor to the other. A portion of the light brought to reading station 4 by light guide 6 is reflected or diffused by a record bearing document and collected and received by two light guides 7 and 8, which can be of the same type as light guide 6. The light thus received is transmitted to the sensitive surface of a photoelectric element 9, which is connected to an amplifier 10 adapted for furnishing electrical signals in response to the reading of marks or of perforations. The ends F7 and F8 of light guides 7 and 8, which are located facing reading station 4, are shaped in a manner such that the light proceeding from the reading station is refracted and transmitted from the faces F7 and F8 substantially along the axes of light guides 7 and 8. On the other side of the passage through which the record media are advanced, a photoelectric element 11 is disposed, which is connected to an electric amplifier 12. Photoelectric element 11 receives light proceeding from light guide 6 and passing through a perforation in a document and through an aperture 13 cut in guide plate 2.

Figure 2:
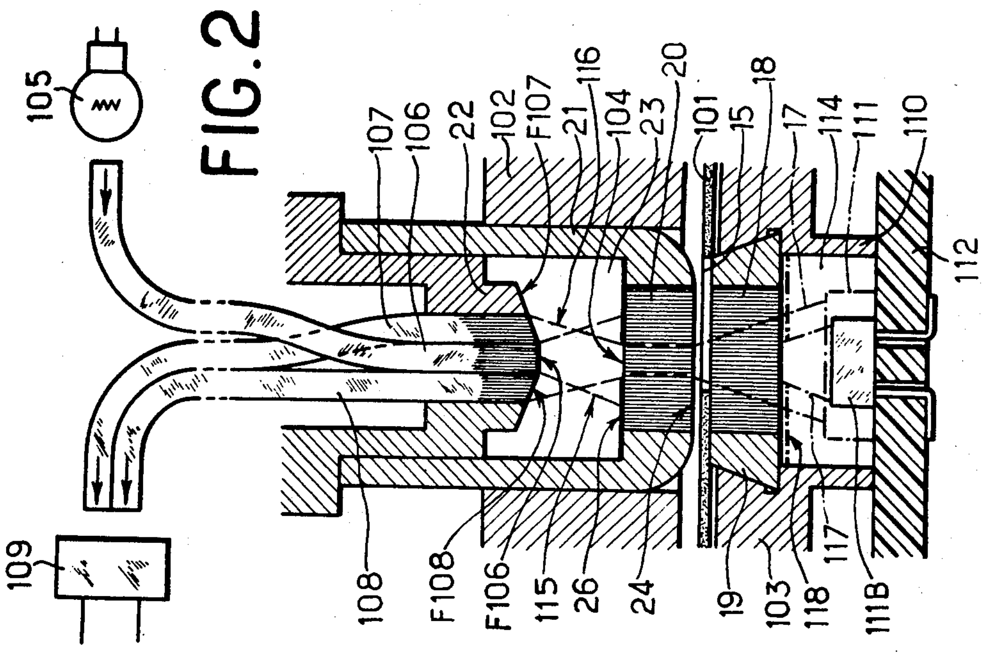
FIG. 2 is a reading apparatus analogous to that shown in FIG. 1, but comprising improvements in accordance with the invention.

The reading apparatus which is shown in FIG. 2, by way of example for illustrating an application of the invention, is composed principally of elements analogous to those constituting the arrangement represented in FIG. 1. However, it is evident that embodiments established in accordance with the invention are equally applicable to reading apparatuses comprising optical devices which differ somewhat from those which have been shown in FIG. 1. Particularly, such optical devices are those which bring light into reading station 4, which receive light proceeding from this station, and which transmit the received light to a photoelectric element.

In FIG. 2, an image conductor block 20 is disposed between a reading station 104 and the optical reading apparatus and a passage channel for the documents 101 to be analyzed. Image conductor block 20 is formed, as has been previously described herein, by a large number of parallel light conductive fibers assembled into a block. The fibers of block 20 are disposed substantially perpendicular to the surface of the documents 101 to be analyzed and perpendicular to reading station 104, which is at a predetermined distance from the ends F106, F107, and F108 of the light guides 106, 107 and 108. Light guide 106 conducts the light provided by a light source 105 into reading station 104 of the optical reading apparatus. Light guides 107 and 108 conduct light proceeding from reading station 104 to a photoelectric element 109. Facing reading station 104, the ends of light guides 106, 107 and 108 are mounted in a support 22. Image conductor block 20 is mounted in a housing 21, in which is also mounted the support 22 of the light guides to form an airtight or dust proof assemblage defining a closed space 23 into which neither dust nor vapors originating external thereto can penetrate. Housing 21 is set into a support plate 102 which forms the upper part of the passage in which the documents to be analyzed are advanced. The lower face 24 of image conductor block 20 is immediately proximate to the documents which are advanced in the passage, so that the friction of these documents against the lower face of block 20 keeps it continuously clean, free from dust or from vapor condensations during the employment of the equipment.

The upper face of image conductor block 20 may be provided with a diaphragm 26 arranged to define a slit in reading station 104, this diaphragm operating to augment the precision, i.e., the image definition, of the reading apparatus. In fact, the light emerging from the light guide 106 for illuminating reading station 104 forms a divergent beam 115, which at the level of the reading station illuminates an area whose extent increases as the end F106 of light guide 106 is further removed from the reading station. However, the distance between light guide 106 and reading station 104 cannot be reduced indefinitely, in order to reduce this illuminated area, without encountering the disadvantage that the light reflected into the reading station by a document cannot reach light guides 107 and 108, which are disposed on each side of guide 106. Moreover, if no diaphragm is employed, the dimensions of the elements of the reading apparatus are necessarily determined by the width of the marks or of the perforations to be analyzed and by their separation. However, in the present instance, the width of the slit of diaphragm 26 determines the effective width of the document which is examined at each instant, and the light beam reflected by a document through this slit, even though very narrow, can easily reach light guides 107 and 108 because the reflected light emerges from block 20 as a divergent beam 116. Because of this, it is no longer necessary to limit the width of image conductor block 20 when employing a diaphragm with a slit of which the width is adapted for reading marks or perforations having a width of from 1 to 1.5 mm and spacing interval of 2.21 mm. Using a diaphragm provided with a slit of reduced width, accurate reading is provided for the bars of COC5 characters or for similar characters visually legible which are formed by parallel printed bars 0.15 mm in width and arranged in coded combinations. The slit of diaphragm 26, regardless of the embodiment, is placed in an airtight space and can be neither impaired nor obstructed in any fashion by dust.

As in the apparatus of FIG. 1, the device shown in FIG. 2 comprises a second portion, disposed on the other side of the passage, adapted for reading either perforations in a card or opaque marks placed on a translucent support. In FIG. 1, an aperture 13 in guide plate 2 is of dimensions adapted for delimiting the extent of the reading field examined by photoelectric element 11. In FIG. 2, for the reading of perforations, diaphragm 26 of image conductor block 20 can be sufficient. In fact, the light passing through the slit of diaphragm 26, through block 20, and through a perforation 15, only diverges at the lower face 24 of block 20 to form a divergent beam 17, which is collected by the sensitive face of a photoelectric element 111.

In FIG. 2, in the preferred embodiment, there is shown a second image conductor block 18, which is interposed between the passage channel of the documents and the second photoelectric element. Because of this, the beam 117 emerging from conductor block 18 is scarcely wider than when it emerged from block 20. The light of this beam can therefore be received by a photoelectric element 111B of dimensions which are very much less than the dimension of the element 111, which is disposed at the same level. This arrangement is particularly advantageous to provide for the realization of "columns, of readout"; i.e., of arrangements comprising a series of reading devices disposed for reading simultaneously all of the record positions of a column or of a line of a card, for example. Image conductor block 18 is mounted in support 19, affixed to a support plate 103, Plate 103 is provided with partitions 110 against which rests an insulating plate 112 supporting the photoelectric elements. With this arrangement, each photoelectric element is enclosed in a closed space 114, airtight against dust and protecting the active faces of the photoelectric elements and the lower face of image conductor block 18. It is to be understood that a second diaphragm 118 may be provided on the lower face of block 18. This diaphragm, represented by dashed lines in FIG. 2, benefits from protection similar to that provided to diaphragm 26.

In practice, the length of the image conductor blocks is only a few millimeters and their width can be reduced to the dimensions of a slit so as to eliminate the employment of a diaphragm. In the example of FIG. 2, light guides 106, 107 and 108 are image conductors of rectangular cross-section, at least near their ends facing the reading station, for the reading of rectangular marks or perforations.

It is evident that the arrangements which have been described by way of example, for illustrating one form of the embodiment of the invention, are not at all limiting, and that modifications can be made to these arrangements, according to the situation and the application without departing from the invention.

I claim:

1. Apparatus for the reading of marks and perforations on record media, including a lighting device adapted for illuminating a reading station and a reading device optically adapted for receiving light reflected or diffused into said station by a record medium advanced through said apparatus, wherein the improvement comprises; an image conductor block, a housing, said block being fixed in said housing, said housing forming with said block an airtight assemblage and providing for a face of said block to be disposed proximate to said record media, said block comprising rectilinear light conductive fibers elongated in a direction perpendicular to said face, and wherein the length of said fibers is such that the other face of said block is spaced from said lighting device and said reading device.

2. The apparatus of claim 1, wherein said image conductor block is provided on the face thereof facing said reading device with a diaphragm defining a slit for examining a record medium with said reading device.

3. The apparatus of claim 1, wherein for the exclusive reading of perforations, a photoelectric element is disposed on the side of said block opposite to said lighting device for receiving light passing through a perforation in a record medium.

4. The apparatus of claim 2, wherein for the exclusive reading of perforations, a photoelectric element is disposed on the side of said block opposite to said lighting device for receiving light passing through a perforation in a record medium.

5. The apparatus of claim 3, wherein there is provided an additional image conductor block formed of rectilinear light conductive fibers and having a length of the same order as that of the first mentioned block, said additional block being disposed in an airtight base between said photoelectric element and said reading station.

6. The apparatus of claim 4, wherein there is provided an additional image conductor block having a length of the same order as that of the first mentioned block, said additional block being disposed in an airtight base between said photoelectric element and said reading station.

7. Apparatus for sensing indicia borne by a record medium, comprising in combination:

a source of electromagnetic energy, said source emitting electromagnetic energy at an emitting surface thereof;

a receiver of electromagnetic energy, said receiver collecting electromagnetic energy at a collecting surface thereof;

a dust proof housing defining a closed space therein, said emitting and collecting surfaces being supported in said housing;

an image conducting member passing through a wall of said housing and being provided with an interior surface inside said housing and an exterior surface outside said housing, said interior surface facing and being spaced apart from said emitting and collecting surface, said image conducting member being formed of a plurality of light conducting fibers extending between and oriented perpendicular to said interior surfaces; and support means for supporting a record medium proximate to said exterior surface.

8. The apparatus of claim 7, wherein said image conducting member is juxtaposed relative to said housing for receiving at the interior surface thereof electromagnetic energy emitted by said emitting surface, transmitting said emitted energy therethrough to said exterior surface, and directing said emitted energy from said exterior surface to illuminate a portion of said record medium; and for receiving at the exterior surface thereof electromagnetic energy reflected by said record medium, transmitting said reflected energy therethrough to said interior surface, and directing said reflected energy from said interior surface to illuminate said collecting surface.

9. The apparatus of claim 7, wherein said housing is airtight.

10. The apparatus of claim 7, wherein said electromagnetic energy comprises light.

11. The apparatus of claim 7, wherein said support means is adapted to move said record medium substantially parallel to and against said exterior surface to provide motional friction between said medium and said exterior surface.

12. The apparatus of claim 7, further including photoelectric means coupled to said receiver and responsive to the electromagnetic energy collected thereby for generating corresponding electrical signals.

13. The apparatus of claim 8, further including photoelectric means disposed opposite to the other face of said record medium from said exterior surface and adapted to receive and respond to electromagnetic energy directed from said exterior surface to illuminate said medium and passing through said medium.

* * * * *